US012595660B2

(12) United States Patent
Kalinowski

(10) Patent No.: US 12,595,660 B2
(45) Date of Patent: Apr. 7, 2026

(54) PANEL-LAYER SYSTEM FOR THERMAL INSULATION OF THE SHADED SURFACE

(71) Applicant: Adam Kalinowski, Poznan (PL)

(72) Inventor: Adam Kalinowski, Poznan (PL)

( * ) Notice: Subject to any disclaimer, the term of this patent is extended or adjusted under 35 U.S.C. 154(b) by 1016 days.

(21) Appl. No.: 17/660,840

(22) Filed: Apr. 27, 2022

(65) Prior Publication Data

US 2022/0349183 A1 Nov. 3, 2022

(30) Foreign Application Priority Data

Apr. 28, 2021 (PL) .......................................... 437721

(51) Int. Cl.
*E04F 10/10* (2006.01)
*E06B 9/24* (2006.01)

(52) U.S. Cl.
CPC ...... *E04F 10/10* (2013.01); *E06B 2009/2417* (2013.01)

(58) Field of Classification Search
CPC .............. E04F 10/10; E06B 2009/2417; E06B 2009/1505; E06B 2009/2482; E06B 2009/2494; E06B 9/38
See application file for complete search history.

(56) References Cited

U.S. PATENT DOCUMENTS

| | | | | |
|---|---|---|---|---|
| 2,723,716 A * | 11/1955 | Oreste ...................... | E06B 9/384 160/168.1 R |
| 2,859,494 A | 11/1958 | Hull | |
| 6,371,191 B1 * | 4/2002 | Woodring ............... | E06B 9/386 160/236 |
| 10,030,440 B2 * | 7/2018 | Fonville .................. | E06B 9/307 |
| 2003/0221800 A1 * | 12/2003 | Jones ....................... | E06B 9/386 160/168.1 R |
| 2011/0126992 A1 * | 6/2011 | Yordanova .............. | H02S 20/30 160/405 |
| 2018/0023338 A1 | 1/2018 | Werner | |

FOREIGN PATENT DOCUMENTS

| | | |
|---|---|---|
| CN | 204609717 U | 9/2015 |
| EP | 4144931 A1 | 1/2023 |

* cited by examiner

*Primary Examiner* — Beth A Stephan

(57) ABSTRACT

A layered panel system for thermal insulation of a shaded surface is disclosed. The system includes a support structure mounted to the exterior of a building partition, such as a window or roof window. The structure comprises at least two rigid rails to which multiple slats are permanently affixed. Each slat is inserted into a groove in the structure and bonded with adhesive. The outer edge of each slat has an irregular shape. Slats are inclined at fixed angles, with upper slats having an angle not greater than 70°, and lower slats decreasing progressively to no more than 25°. The support structure is positioned such that a ventilated air gap of between 10 mm and 100 mm is maintained between the slats and the partition surface. The design enhances solar protection and airflow while allowing light modulation based on slat geometry and inclination.

15 Claims, 6 Drawing Sheets

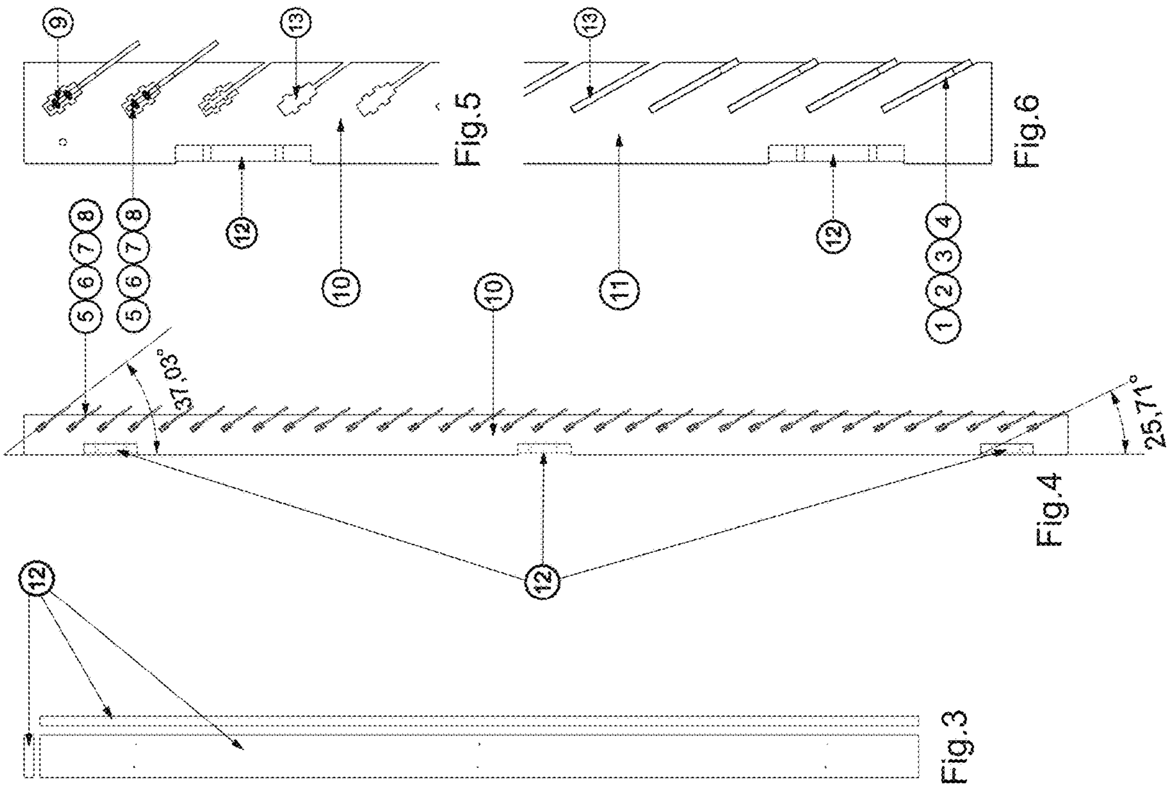
Fig.5
Fig.6
Fig.4
Fig.3
37,03°
25,71°
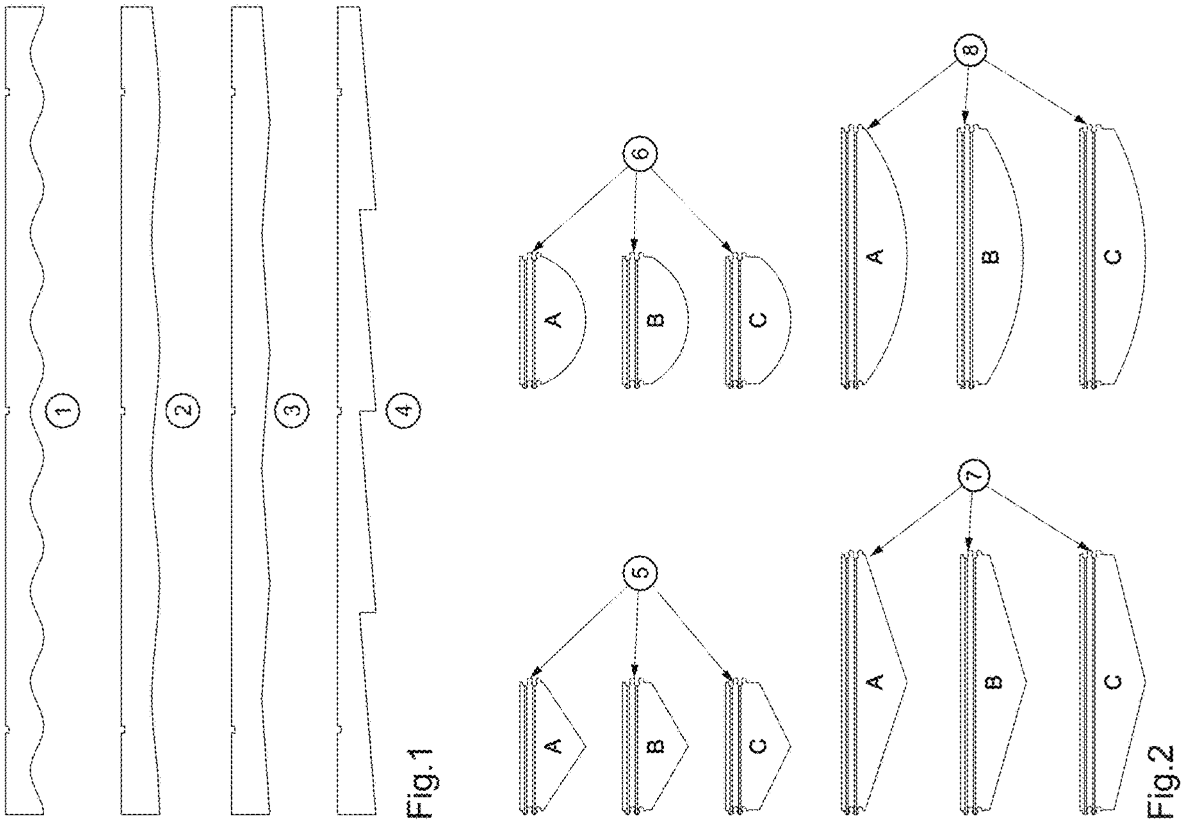
Fig.1
Fig.2

PANEL-LAYER SYSTEM FOR THERMAL INSULATION OF THE SHADED SURFACE

TECHNICAL FIELD

The invention relates to the field of architectural shading devices, specifically to a layered panel system designed for the thermal insulation of externally shaded surfaces, particularly glazed surfaces such as windows, skylights, storefronts, and similar structures.

BACKGROUND OF THE INVENTION

Sunlight is a critical environmental resource that significantly influences both occupational and private activities. Its availability determines the spatial layout of day and night zones in residential buildings and defines the arrangement of work and storage areas in industrial facilities. In large-scale structures-commonly constructed in the form of halls-roof-mounted glazing is frequently installed above production lines to improve lighting conditions and enhance workplace safety.

Natural daylight is considered optimal in terms of color fidelity and health benefits, especially in environments involving moving machinery, including rotating equipment. Furthermore, solar light incurs no cost, making it an attractive solution from an economic standpoint.

However, the introduction of natural light into buildings, whether in residential or industrial contexts, is associated with a substantial influx of thermal energy into the illuminated surfaces. To counteract this, conventional systems such as internal blinds, roller shades, or external awnings are widely implemented. These systems serve the primary function of reducing solar gain by obstructing light, yet this purpose conflicts with the fundamental rationale for integrating transparent or translucent architectural elements such as glazed walls or roofs.

Typical internal blinds are composed of slats (lamellae) suspended on cords or supported by tensioned lines, whose tilt angle or vertical position can be adjusted to vary the degree of shading. For instance, patent application GR20180200111 discloses a blind system in which the slats are interconnected by a control cord that allows the angle of inclination to be modified from a perpendicular orientation to a closed, light-blocking position. However, it must be noted that such internal blinds do not prevent the glazing itself from heating up, which then acts as a secondary source of radiant heat.

In another example, as disclosed in KR20160131565, each slat is individually mounted within a frame and collectively connected to a tilt-control mechanism. Similar principles are found in KR20040022628, where a control shaft is coupled to a torsional element through a Cardan-like joint to facilitate angular adjustment.

More advanced solutions, such as that described in KR20150025474, incorporate semi-transparent materials sewn into horizontal, box-shaped cells, allowing sunlight to diffuse while softening the interior illumination and improving aesthetic qualities. Roller shades constructed with multi-layered or reinforced fabrics—such as those disclosed in CN208564410—achieve additional thermal insulation by selecting appropriate material thickness and translucency levels.

External roller shutters operate on similar principles but are typically made from rigid polymer or metal components, sometimes featuring anti-burglary properties. Additionally, various fixed-slat façade systems exist in which slats are permanently mounted at uniform angles either directly to the façade or via a secondary support structure.

All of the aforementioned systems rely on the non-transparency of slats and on angling those slats such that direct solar radiation is prevented from reaching the glazing surface. However, these systems do not provide optimal thermal management when considered in conjunction with lighting performance.

SUMMARY OF THE INVENTION

Unexpectedly, it has been discovered that optimal thermal insulation of architectural barriers (e.g., windows or skylights) and the interior spaces behind them can be achieved—not by using opaque slats or variable-tilt mechanisms—but rather by employing slats with a fixed angle of inclination, irregular edge geometry, and at least 30% light transmission, installed in conjunction with a ventilated cavity between the slats and the glazing surface.

DETAILED DESCRIPTION OF THE INVENTION

The layered panel system for thermal insulation of shaded surfaces, in accordance with the present invention, comprises a support structure mounted externally onto a building envelope, particularly onto glazed architectural elements such as roof windows or vertical window frames.

The support structure consists of at least two rigid, non-deformable guide rails. A plurality of slats is permanently affixed to these rails, preferably by means of a fastening strip. The slats are arranged in a fixed inclination relative to the plane of the protected surface. The outer edge of each slat—facing away from the protected glazing—is formed with an irregular contour. In one embodiment, the slats are inserted into grooves or slots formed in the support rails and are additionally adhered to the structure for mechanical stability.

In another embodiment, the slats are constructed in a panelized configuration comprising multiple smaller panels fitted into a longitudinal fastening strip. This fastening strip is fixed at both ends to the supporting rails. The panels are preferably interlocked by shape-fitting means, such as snap connections, and may include a longitudinal opening through which the fastening strip passes. The cross-section of the fastening strip may have a generally C-shaped profile, optionally with at least one longitudinal groove or recess, into which the panel's matching edge features can engage.

The slats and panels may be manufactured from synthetic polymers, such as PET for the support structure and Plexiglas (PMMA) for the slats or panels. At least one surface of each slat or panel is coated with a reflective film that has a light transmission capacity between 20% and 90%. Preferably, the reflective surface is achieved via vacuum-deposited aluminum dust fixed onto the substrate.

In another preferred embodiment, the reflective layer exhibits photochromic properties, dynamically adjusting light transmission depending on the intensity and angle of incident solar radiation. Alternatively, solar control film with fixed opacity between 20% and 90% can be applied to at least one surface of each slat.

The shape of the slats' external edge may be selected from sinusoidal profiles, irregular waveforms, or a sequence of alternating geometric motifs, including but not limited to portions of circles, rectangles, triangles, or other polygons.

In yet another embodiment, the slats or panels are equipped with integrated longitudinal protrusions formed on at least one side. These protrusions are preferably manufactured from the same material as the base slat or panel and arc fixed in a configuration that forms an acute or nearly right angle relative to the main slat surface. These ribs may vary in height and profile along the slat's length and contribute to light diffusion, turbulence generation in the cavity, or aesthetic effects.

The inclination angle of each slat is constant. For slats located in the upper portion of the window or architectural surface, the inclination angle relative to the plane of the glazing is no greater than 70°, preferably 38°. The angle progressively decreases toward the bottom of the structure, where the lowermost slat is inclined at no more than 45°, preferably 25°. The slats' inclination profile preferably follows a linear gradient calculated as:

(Angle of topmost slat−angle of bottommost slat)/number of slats

The spacing between the slats, measured along the edge of the support rails, is calculated as:

(Total vertical span between topmost and bottommost slats)/number of slats

The distance between the support structure and the outer glazing surface is in the range of 10 mm to 100 mm. The support rails are mechanically fixed to the window frame by means of brackets mounted in the upper region of the glazing and locked in place with additional brackets at the bottom, thereby preventing lateral and vertical displacement of the system.

The system remains transparent throughout its operational lifespan, allowing natural visible light to penetrate into the interior space. During peak solar elevation (e.g., midday), solar rays are diffused and interrupted by having to pass through multiple slats before reaching the interior. The main thermal emission is thus concentrated in the ventilated air gap between the

Embodiment Example I

In a first exemplary embodiment of the invention, the layered panel system for thermal insulation of shaded surfaces comprises a support structure mounted externally to a building enclosure, specifically to a roof window. The support structure includes rigid and non-deformable rails, to which slats are permanently affixed. The slats have outer edges—relative to the protected surface—with irregular contours.

Each slat is inserted into pre-formed slots in the support rails and additionally bonded thereto using an adhesive. The angle of inclination of each slat is fixed. The uppermost slat is inclined at 38° relative to the plane of the protected surface, and this angle linearly decreases downward, such that the lowermost slat is inclined at 25°.

The change in slat angle follows a linear function:

13°/total number of slats

The distance between slats, measured along the edge of the supporting structure, is:

Total span between top and bottom slats/total number of slats

The support structure is spaced 10 mm from the outer glazing surface.

The support rails are mounted to the window exterior via snap-fit brackets secured into the upper window frame, with the system resting on two lower brackets to prevent displacement both laterally and vertically.

The rails are fabricated from PET (polyethylene terephthalate), and the slats are laser-cut from Plexiglas (PMMA). One surface of each slat is coated with a reflective film having 20% light transmission, achieved by depositing aluminum dust fixed onto the surface.

The external edge of each slat has a sinusoidal profile.

The system remains fully transparent during use, enabling natural visible light to enter the interior. At midday, high-angle solar rays arc interrupted as they must pass through at least several slats before reaching the glazing. The primary heat emission therefore occurs within the air gap between the slats and the glazing. This air volume remains ventilated, thereby preventing thermal buildup in the glass or the room behind it.

Embodiment Example II

In a second exemplary embodiment, the system comprises rigid rails installed externally on a roof window, with slats having irregular outer edge contours. The slats are inserted into support slots without adhesive.

Each slat is positioned at a fixed inclination. The topmost slat is inclined at 37.03°, decreasing linearly to 25.71° for the lowermost slat.

Angle gradient:

(37.03°−25.71°)/number of slats

Spacing between slats is again:

Total span/number of slats

The support structure is located 100 mm from the glazing surface. It is mounted using upper snap-fit brackets and lower stabilizing brackets.

Materials are consistent with Example I: PET for rails and Plexiglas for slats. One surface of each slat is covered with a solar-control film that reflects sunlight and allows light transmission between 20% and 90%. The film used is a darkening sun-protection film.

The outer slat edge shape is chosen from sinusoidal curves, irregular waves, or alternating geometric forms including partial circles, rectangles, triangles, or polygons.

The system remains optically transparent, permitting natural light to enter while solar radiation is interrupted by the slats and released in the ventilated air cavity between the slats and the glazing.

Embodiment Example III

In this variant, the slats are formed from multiple smaller panels inserted into guide rails and adhesively bonded to the support structure. The system is installed on the outer surface of a roof window.

Slats retain fixed inclination angles: 37.03° at the top, decreasing linearly to 25.71° at the bottom, with spacing and angular adjustment values calculated as in previous examples.

The support structure is spaced 100 mm from the glazing surface and is fixed in the same way using top brackets and bottom stabilizers.

The support rails are made of PET, and the slat panels are cut from Plexiglas. One surface of each panel is laminated with a reflective solar film allowing transmission between 20% and 90%, with the film laminated or bonded as a sun-protection layer.

The external panel edges are shaped as sinusoidal waves, irregular contours, or alternating polygonal shapes. Panels include unilateral longitudinal protrusions made from the same material and affixed at acute or near-right angles to the surface. These projections serve both mechanical and optical functions.

The system permits full transparency and daylight transmission while interrupting high-angle sunlight. The resulting thermal energy is dissipated in the ventilated air cavity, maintaining lower temperatures in the glazing and interior space.

Embodiment Example IV

In this embodiment, the layered panel system is installed on the exterior of a vertically oriented window. The support structure comprises rigid, non-deformable rails to which slats are permanently affixed. The outer edges of the slats, in relation to the protected surface, have irregular shapes. Each slat is inserted into pre-formed slots in the support structure and additionally bonded with adhesive.

Each slat maintains a fixed angle of inclination. For the uppermost slats, the inclination angle is 70° with respect to the plane of the protected surface, decreasing linearly toward the bottom where the lowest slat is inclined at 55°.

As in previous embodiments, the angular variation is linear and defined by:

(Top slat angle−bottom slat angle)/number of slats

The system maintains transparency, permitting natural visible light to pass into the interior. During periods of high solar angle (e.g., midday), solar rays are partially blocked by multiple slats before reaching the glazing surface. Heat buildup is confined to the ventilated cavity between the slats and the glazing, and the airflow within this cavity prevents heat transmission into the interior.

As the sun's elevation varies during the day, the incident angle of solar rays changes. When the sun is low on the horizon, the rays pass more parallel to the slat surfaces, enabling unimpeded daylight penetration between the slats. This feature is especially advantageous in regions such as Central Europe, where most intense solar exposure occurs during summer months (June, July, August), coinciding with increased risk of overheating glazed roof surfaces.

The system ensures effective interior illumination through the slat gaps, especially when direct sunlight strikes the slats. Optionally, when a matte or milky film is applied to the slat surfaces, the slats form a bright planar screen that enhances interior light diffusion.

Embodiment Example V

This embodiment employs a support structure consisting of rigid rails mounted to a roof window, with slats having irregular outer edge contours. The slats are inserted into the support structure slots without adhesive.

The slats are fixed in inclination: 37.03° at the top, decreasing to 25.71° at the bottom, with linear angular variation as in earlier embodiments.

Spacing between slats is consistent with previous examples:

Vertical span/number of slats

The support structure is positioned 100 mm from the glazing surface and fixed using upper snap-fit brackets and lower anti-displacement brackets.

The rails are made from PET, and the slats arc laser-cut from Plexiglas. Each slat has one surface laminated with a solar control film allowing light transmission between 20% and 90%. The film is a sun-protection layer with fixed opacity.

In this embodiment, one slat surface is additionally formed with micro-panels integrally molded—preferably by injection molding—onto the slat surface. These micro-panels are preferably shaped as irregular ribs with non-uniform edge and surface contours. The longitudinal axes of the micro-panels are not perpendicular to the slat's axis, and the angle between them may vary along the slat's length.

Preferred micro-panel height ranges from at least 5 mm to no more than 90% of the slat's depth.

The outer edge of the slat may be formed as a sinusoidal wave, irregular contour, or alternating geometric shapes (e.g., segments of circles, rectangles, triangles, or other polygons).

Embodiment Example VI

In this embodiment, the slats are constructed from multiple panels inserted, for example, into aluminum horizontal rails and additionally bonded into the supporting slots of the structure.

The fixed inclination angles are 37.03° at the top and 25.71° at the bottom, with linear variation across the total number of slats. The distance between slats is calculated identically as in previous examples.

The support structure is mounted 100 mm from the building surface. It is fixed using snap-fit upper brackets and lower supports that prevent vertical and lateral displacement.

The rails are made of PET, and the slat panels are cut from Plexiglas. One surface of each panel is covered with a reflective film with a transmission rate between 20% and 90%, achieved through solar-protection film lamination.

The outer panel edges are shaped as sinusoidal waves, irregular curves, or alternating polygons. The panels are additionally equipped with one-sided longitudinal protrusions, integrally formed from the same material, attached at acute or near-right angles to the panel surface.

Moreover, the slats include integrally molded micro-panels, especially produced by injection molding with the slat or panel surface. These micro-panels may take the form of irregular ribs, with non-uniform geometry and orientation. The angle between the micro-panel axis and the slat axis may vary along the length of the slat. Micro-panel height is no less than 5 mm and no greater than 90% of the slat depth.

The system remains fully transparent in use, admitting natural visible light into the interior. Solar radiation during high sun positions is intercepted by multiple slats, and heat accumulates in the ventilated cavity without transmitting to the interior space.

BRIEF DESCRIPTION OF THE DRAWINGS

The invention will be better understood with reference to the accompanying drawings, in which:

FIG. 1 illustrates various examples of single-unit slats with irregular edge geometries:

A long slat with a short-wave edge;

A long slat with a flat-wave edge;

A long slat with an edge in the form of a flattened isosceles triangle;

A long slat with an edge in the form of an irregular triangle.

FIG. 2 shows different panel shapes with varying depths:

5. Equilateral triangular panels increasing in depth from element A to C;

6. Semicircular panels increasing in depth from A to C;

7. Large triangular panels increasing in depth from A to C;

8. Large semicircular panels increasing in depth from A to C.

FIG. 3 is a top-side cross-sectional view of the horizontal mounting element for vertical guide rails.

FIG. 4 presents a side view of a vertical guide rail.

FIG. 5 shows a configuration used for mini panels, with:

9. Vertical guide rails;

12. Horizontal mounting elements for panels (types 5-8);

13. Cutouts in the horizontal guide rail accommodating panels.

FIG. 6 depicts:

11. Vertical guide rails used with single-unit slats;

13. Cutouts for slats 1-4.

Figure 7:
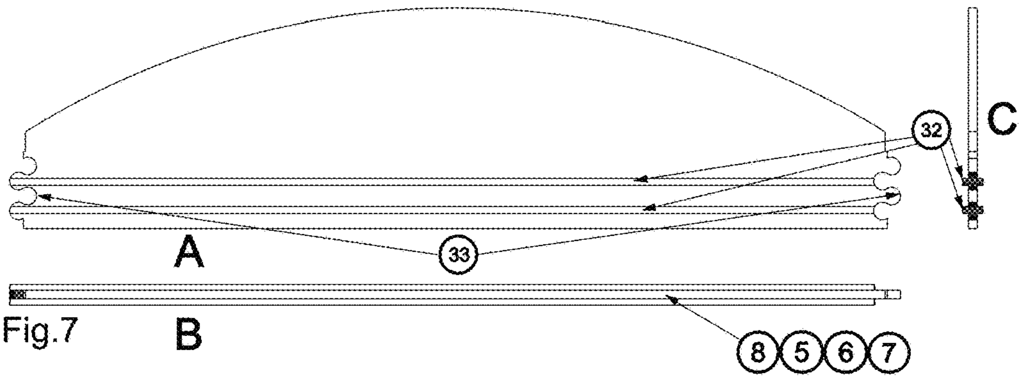
Figure 8:
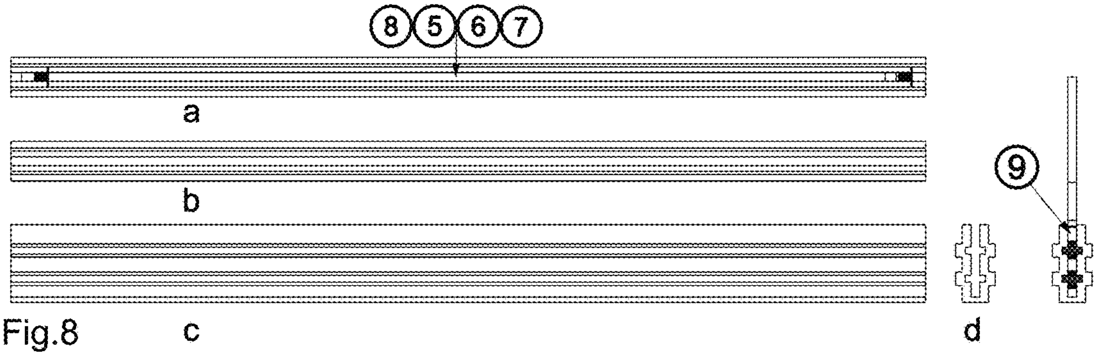

FIG. 7 presents multiple views of a mini panel:

A. Side view;

B. Top view;

C. Cross-sectional view, showing longitudinal embossments and lateral interconnections.

FIG. 8 shows:

9. Panel-in-guide configuration;

a. Top view of panel in guide;

b. Top view of the guide itself;

c. Side view of the guide;

d. Cross-sectional view of the guide.

Figure 9:
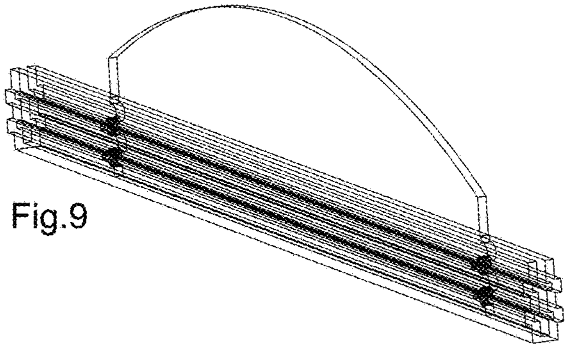

FIG. 9 is a perspective view of a panel with guide rail.

Figure 10:
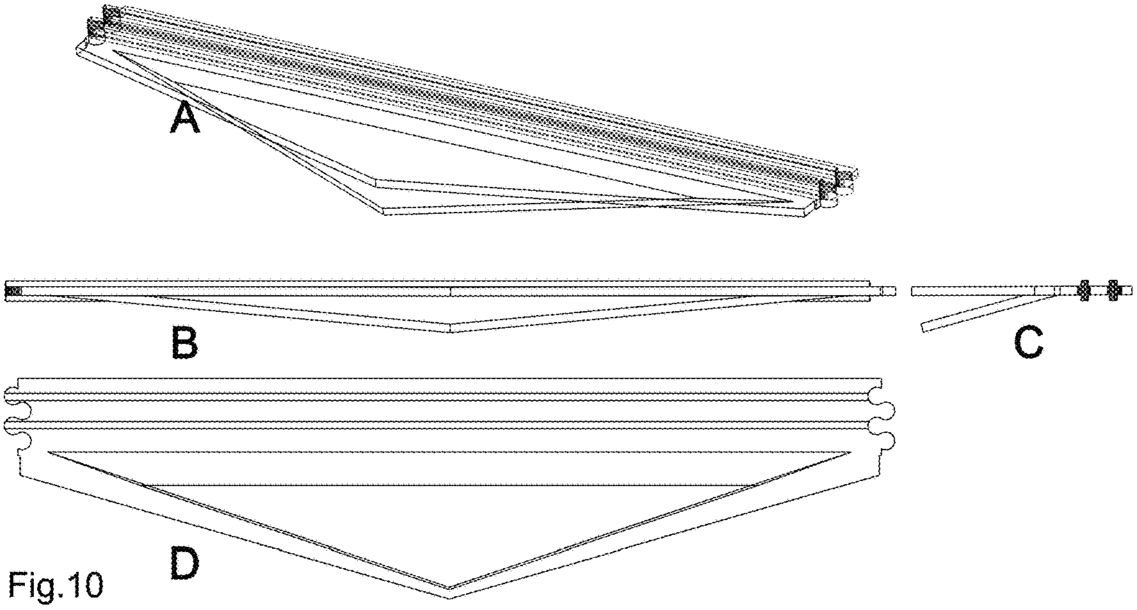
Figure 11:
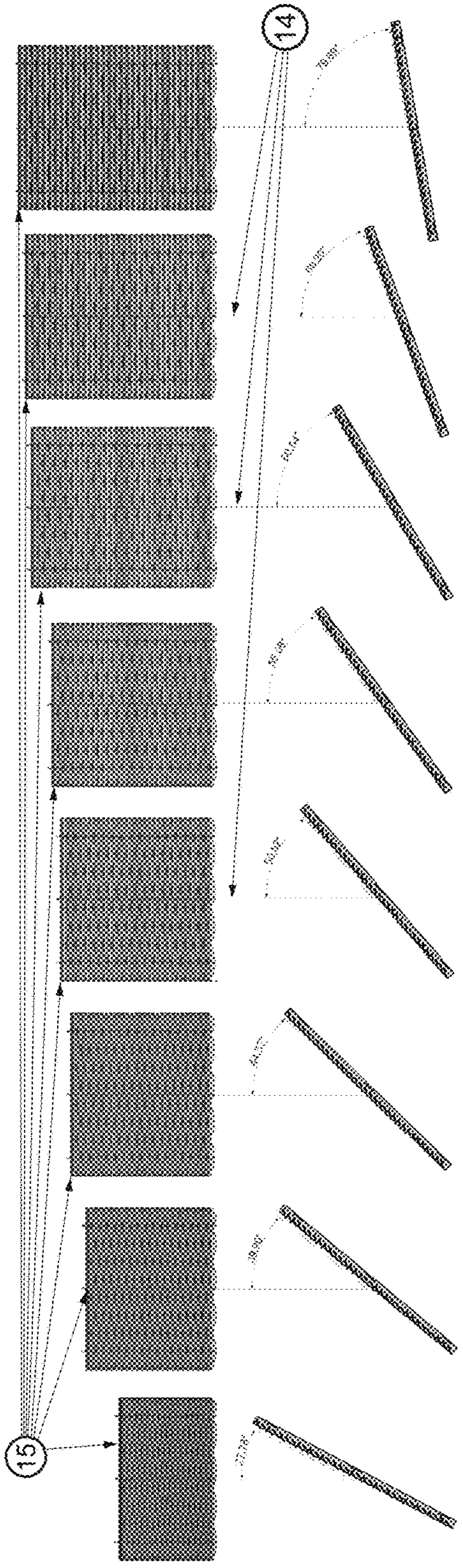

FIG. 10 illustrates a dual-panel configuration:

A. Perspective view;

B. Front view;

C. Cross-sectional view;

D. Top view.

FIG. 11 shows:

14. Solar radiation angle of incidence on slat surfaces;

15. View of slat surfaces in relation to sun angle.

Figure 12:
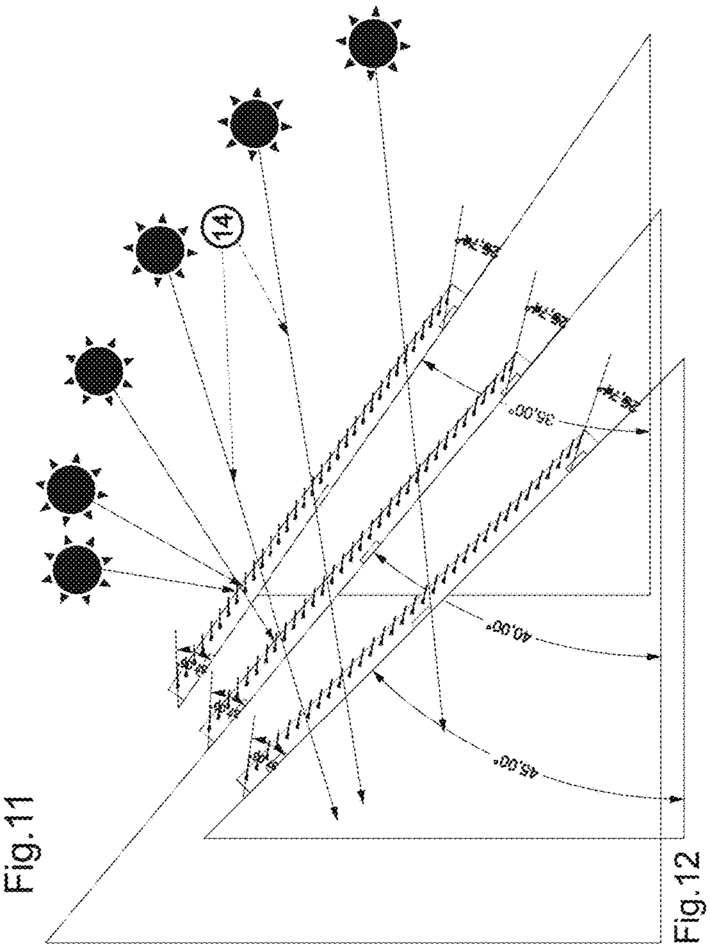
Figure 13:
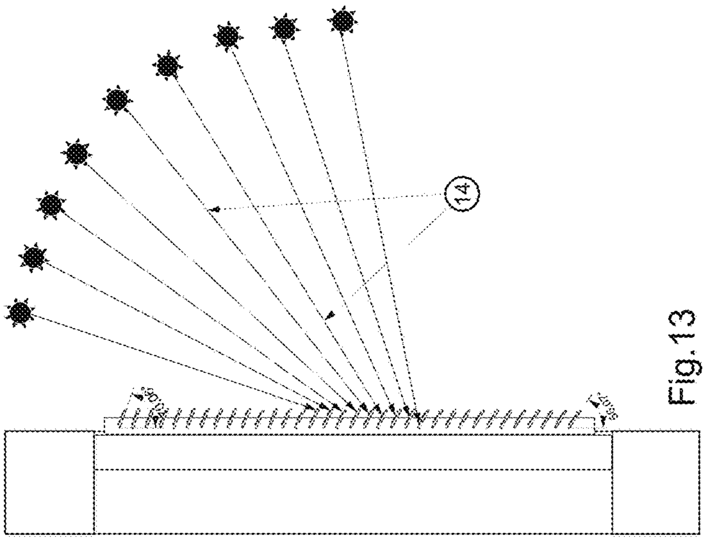
Figure 14:
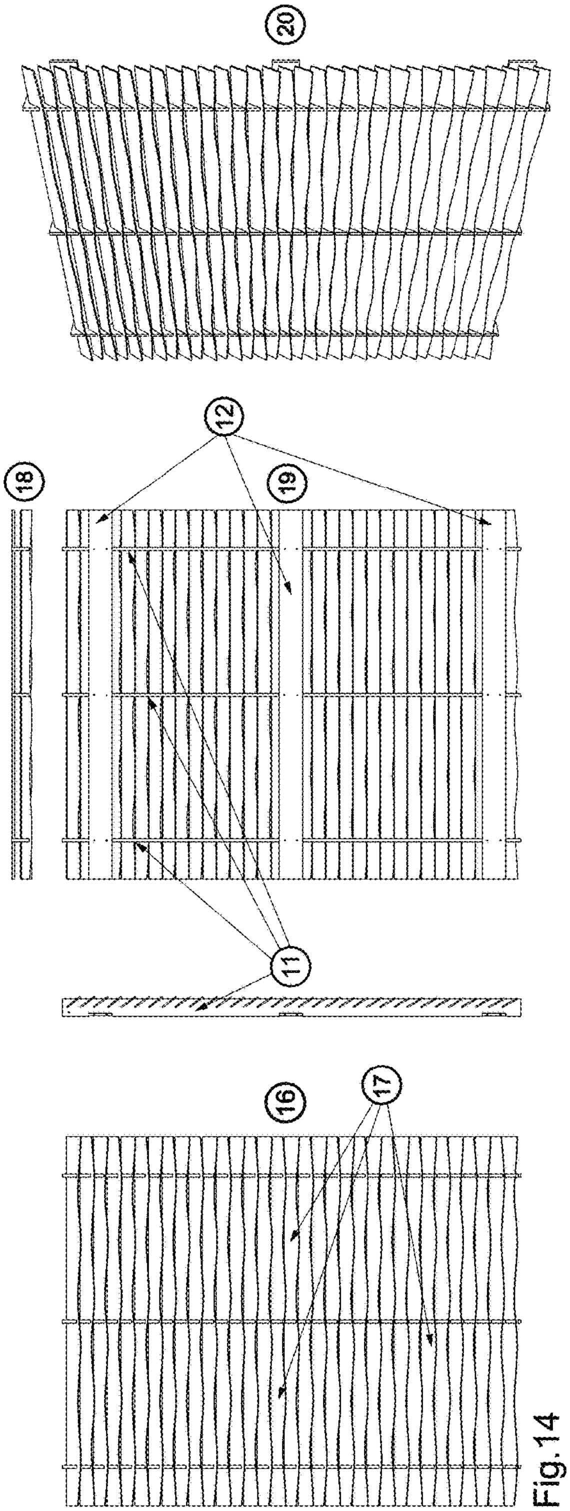
Figure 15:
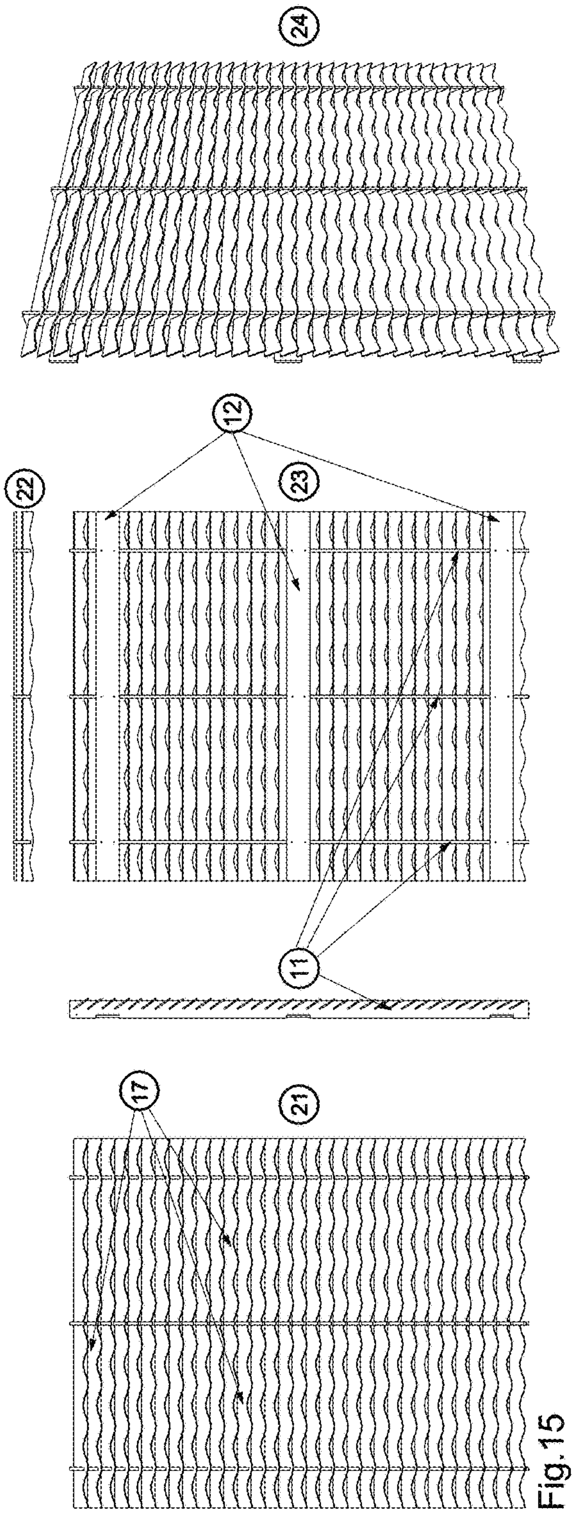

FIG. 12 depicts the angle of incidence of solar radiation on the slats depending on roof pitch from 35° to 45°.

FIG. 13 shows:

14. Solar incidence angles on slats mounted vertically on a façade, indicating range of slat angles from top to bottom.

FIG. 14 shows:

16. A blind using single slats with elongated sinusoidal edge shapes, front view;

17. Light gaps between slats;

11. Vertical support brackets;

18. Top view of the blind;

19. Rear view of the blind;

12. Horizontal mounting element;

20. Perspective view of blind with single-unit slats.

FIG. 15 shows:

21. Blind using slats with short sinusoidal edge shapes;

11. Side view of the blind and vertical support brackets;

12. Horizontal mounting element;

17. Light gaps between slats;

22. Top view;

23. Rear view;

24. Perspective view.

FIG. 16 shows:

7C. Panels with maximum depth;

7A. Panels with minimum depth;

9. Horizontal guide rails for mini panels;

10. Vertical support rails used with panels;

12. Horizontal mounting element;

25. Top view of blind with panels;

26. Front view with vertically aligned panels;

27. Rear view with panels;

32. Gaps between shallow panels 7A;

33. Gaps between deep panels 7C.

FIG. 17 shows:

8C. Large semicircular panel with maximum depth;

6C. Small semicircular panel with maximum depth;

9. Horizontal panel guide;

10. Side view of vertical support guide rail;

12. Horizontal mounting element;

17. Gaps between panels;

28. Top view of blind with alternating panels;

29. Front view with alternating panels;

30. Rear view with alternating panels;

31. Perspective view.

Figure 18:
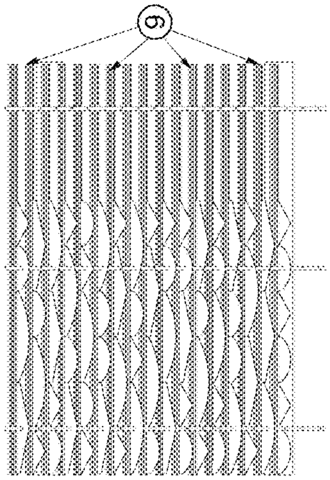
Figure 16:
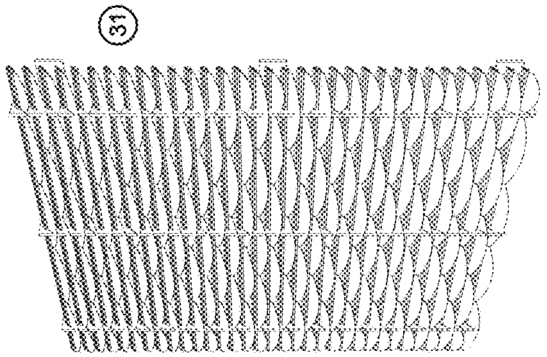
Figure 16:
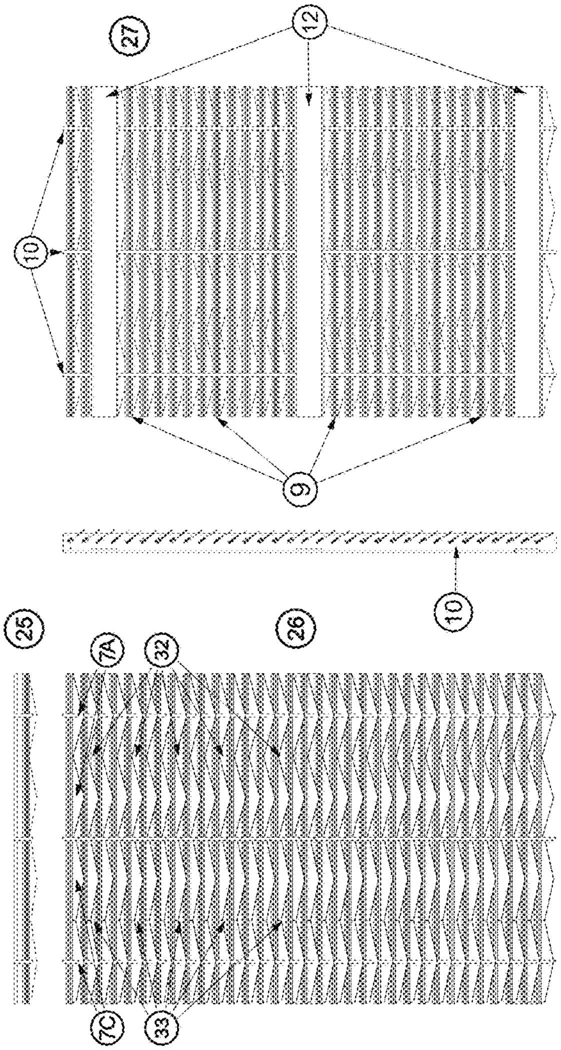
Figure 17:
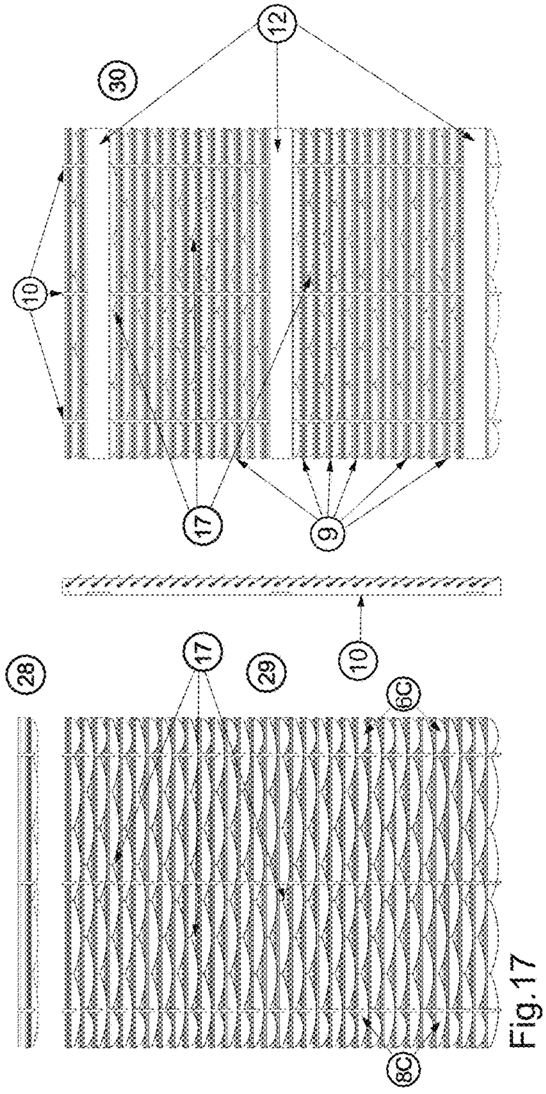
Figure 20:
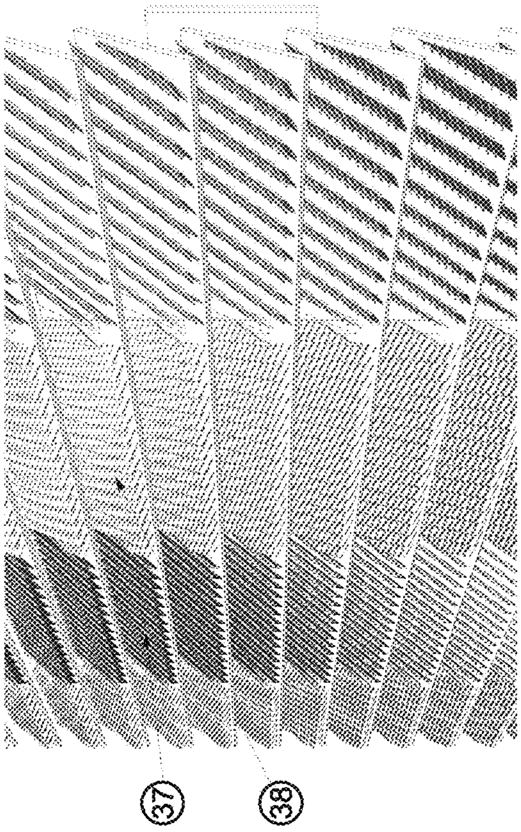

FIG. 18 shows a blind using freely arranged panels of different shapes.

Figure 19:
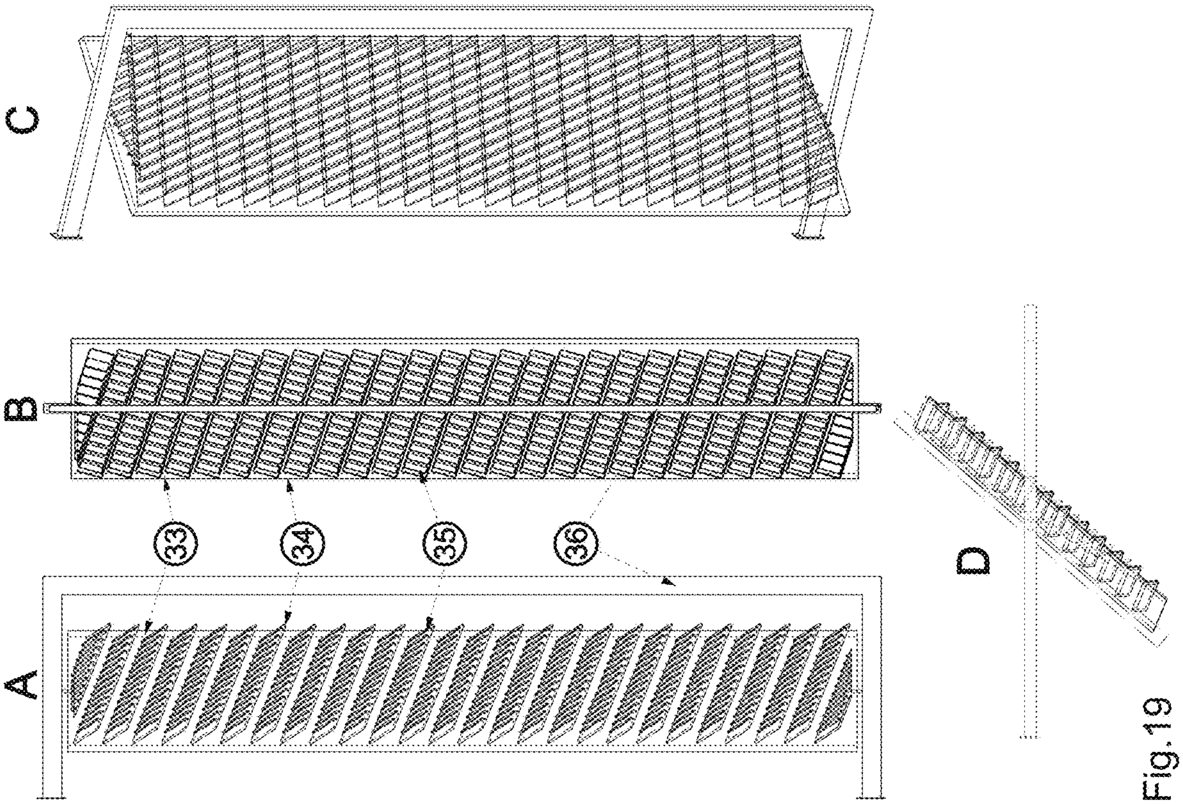

FIG. 19 presents a single panel with integrated micro-panels for vertical wall mounting:

A. Side view;

B. Front view;

C. Perspective view;

D. Top view;

33. Structural base of the panel;

34. Medium-sized slats integrated with the base;

35. Small slats attached to medium ones;

36. Mounting frame for façade attachment.

FIG. 20 shows:

37. Medium-sized slats with small slats oriented to the right (top view);

38. Medium-sized slats with small slats oriented to the left (top view);

Displayed on a transparent rectangular prism panel surface with slats arranged diagonally.

Figure 21:
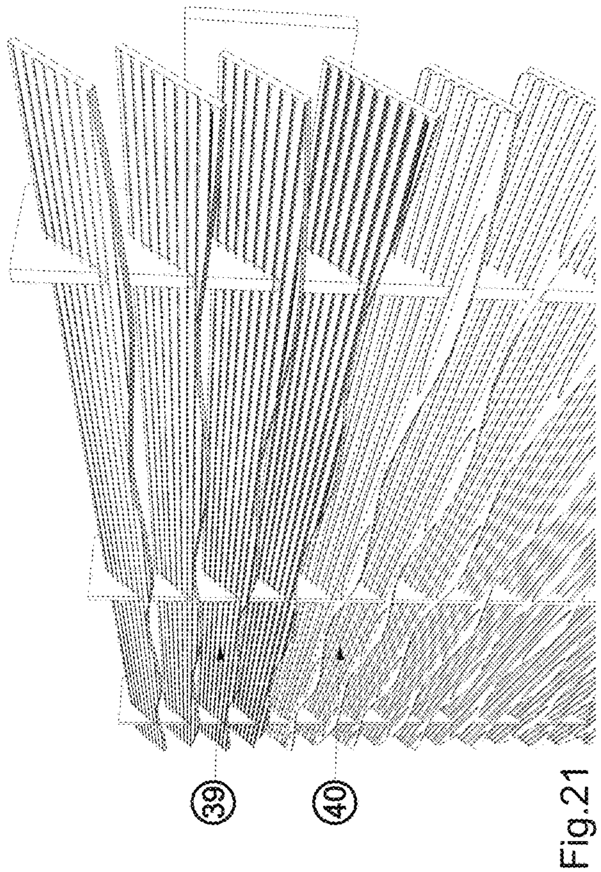

FIG. 21 shows an example of micro-panels applied longitudinally and in parallel on a wave-shaped slat surface:

39. Micro-panels oriented toward the lateral edge of the main slat;

40. Micro-panels oriented toward the shaped edge of the wave-profiled slat.

The invention claimed is:

1. A layered panel system for thermal insulation of a shaded surface, comprising:

a support structure mounted to an external surface of a building partition, the support structure comprising at least two rigid and non-deformable rails; and a plurality of slats or panel units permanently affixed to said rails in a layered, inclined configuration relative to the external surface;

wherein the inclination angle of each of the slats is fixed, and the angles decrease progressively from a topmost of the slats to a bottommost of the slats according to a predefined gradient; wherein a ventilated air cavity is formed between the slats and the external surface, the support structure being spaced from the external surface by a distance between 10 mm and 100 mm; and wherein each of the slats includes an edge with an irregular shape and comprises at least one surface covered with a light-transmitting, solar-reflective or solar-protective film having transmission between 20% and 90%.

2. The system of claim 1, wherein the support structure is mounted using snap-fit brackets fixed to upper and lower parts of a window or roof window frame of the partition, providing resistance to lateral and vertical displacement.

3. The system of claim 1, wherein the inclination angle of the topmost slat is not greater than 70°, preferably 38°, and the bottommost slat is not greater than 45°, preferably 25°, with intermediate ones of the slats decreasing in angle linearly across the number of slats.

4. The system of claim 1, wherein the slats are constructed as single units inserted into pre-formed grooves in the rails and adhered with bonding material.

5. The system of claim 1, wherein the slats are composed of multiple panels joined to a longitudinal mounting strip secured to the rails.

6. The system of claim 1, wherein each of the slats includes a longitudinal opening through which a non-rotational mounting strip passes.

7. The system of claim 6, wherein the mounting strip has a substantially C-shaped cross-section and comprises at least one longitudinal recess that engages complementary embossments on edges of the slats.

8. The system of claim 1 wherein the irregular shape of the slats is selected from sinusoidal curves, irregular waves, or a sequence of geometric segments including circular arcs, rectangles, or triangles.

9. The system of claim 1, wherein the support structure is made of polyethylene terephthalate (PET), and the slats are made of polymethyl methacrylate (PMMA).

10. The system of claim 1, wherein the solar-reflective or sun-protective film is an aluminum-based coating deposited via vacuum or a laminated foil.

11. The system of claim 1, wherein each of the slats is further provided with integrally formed longitudinal protrusions oriented at acute or near-right angles to a surface of the slats.

12. The system of claim 1, wherein the protrusions form irregular ribs varying in height and shape along a length of the slats to generate turbulence and diffuse light.

13. The system of claim 1, wherein one surface of each of the slats is integrally molded with a plurality of micro-panels oriented obliquely to a longitudinal axis of the slats.

14. The system of claim 13, wherein a height of the micro-panels is at least 5 mm and not greater than 90% of a depth of the slats.

15. The system of claim 1, wherein the slats differ in color, shape, or light transmission characteristics to produce a patterned or performance-graded surface.

* * * * *